United States Patent
Montalto et al.

(10) Patent No.: US 9,638,228 B2
(45) Date of Patent: May 2, 2017

(54) TELESCOPIC TUBE COMPRISING A SCREWLESS, QUICKLY SLIDING ADJUSTING DEVICE HAVING A BLOCKING MECHANISM

(71) Applicant: Big Astor Srl, Turin (IT)

(72) Inventors: Carmelo Montalto, Turin (IT); Daniele Montalto, Turin (IT)

(73) Assignee: Big Astor Srl, Turin (IT)

( * ) Notice: Subject to any disclaimer, the term of this patent is extended or adjusted under 35 U.S.C. 154(b) by 891 days.

(21) Appl. No.: 13/901,968

(22) Filed: May 24, 2013

(65) Prior Publication Data
US 2013/0322956 A1    Dec. 5, 2013

(30) Foreign Application Priority Data

Mar. 15, 2013  (EP) .................................... 13159644

(51) Int. Cl.
*F16B 7/10*    (2006.01)

(52) U.S. Cl.
CPC ................ *F16B 7/10* (2013.01); *F16B 7/105* (2013.01); *Y10T 403/32467* (2015.01)

(58) Field of Classification Search
CPC ..... F16B 7/10; F16B 7/105; Y10T 403/32467
See application file for complete search history.

(56) References Cited

U.S. PATENT DOCUMENTS

| | | | |
|---|---|---|---|
| 3,842,877 A | 10/1974 | Andrews | |
| 4,133,283 A * | 1/1979 | Ryan | B63B 21/00 114/230.18 |
| 4,668,119 A * | 5/1987 | Galletti | E02D 5/285 403/343 |
| 4,756,638 A * | 7/1988 | Neyret | E05B 9/084 403/261 |
| 5,094,643 A * | 3/1992 | Bolli | A63H 33/04 403/348 |
| 8,192,105 B2 * | 6/2012 | Keyvanloo | A47B 47/0016 403/171 |

FOREIGN PATENT DOCUMENTS

| | | |
|---|---|---|
| DE | 3148043 | 6/1983 |
| DE | 19527738 | 4/1997 |
| WO | WO 01/09522 | 2/2001 |

OTHER PUBLICATIONS

Search Report and Written Opinion, TO20120474, Jan. 22, 2013, 6 pages.

* cited by examiner

*Primary Examiner* — Victor MacArthur
(74) *Attorney, Agent, or Firm* — Fish & Richardson P.C.

(57) ABSTRACT

A telescopic tube having an adjusting device comprising an inner toothing angularly interrupted by a longitudinal recess and a male element having an outer toothing angularly interrupted by a second recess so as to axially slide along the longitudinal recess in a first predetermined angular position and selectively engage with the inner toothing in a second predetermined angular position different from the first predetermined angular position for rigidly connecting the bushing to the male element in axial direction.

13 Claims, 5 Drawing Sheets

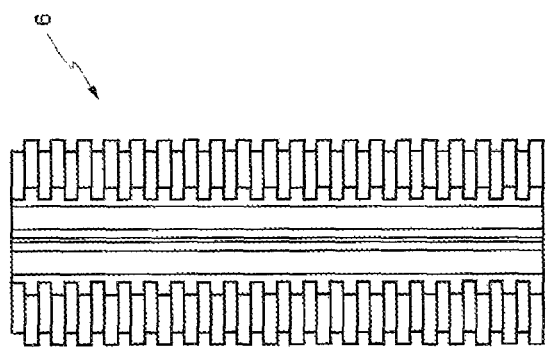
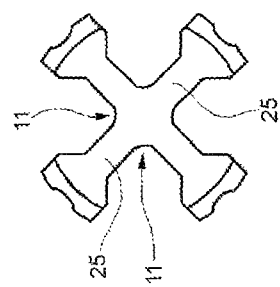
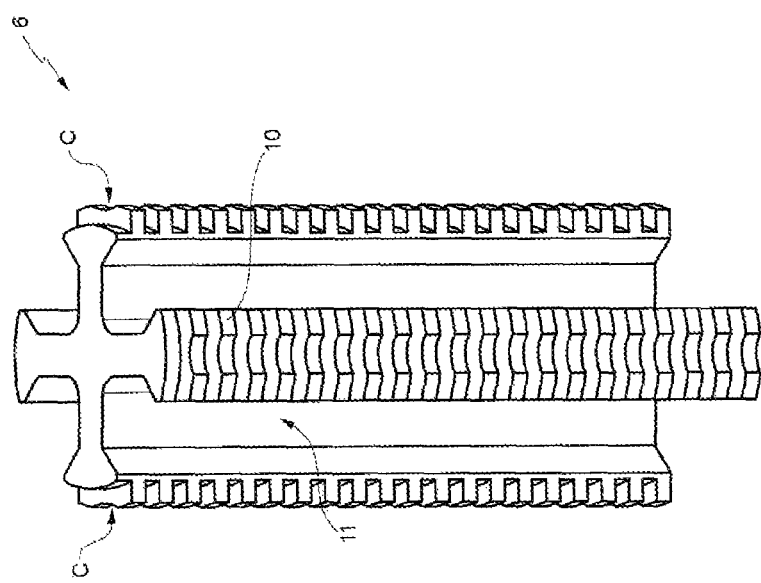
FIG. 2a
FIG. 2b

TELESCOPIC TUBE COMPRISING A SCREWLESS, QUICKLY SLIDING ADJUSTING DEVICE HAVING A BLOCKING MECHANISM

CLAIM OF PRIORITY

This application claims priority to Italian patent application No. 702012000474, filed on May 31, 2012, and to European patent application No. 13159644.7, filed on Mar. 15, 2013, the entire contents of both which are hereby incorporated by reference.

FIELD OF THE INVENTION

The present invention relates to a telescopic tube with an adjusting device, for example for adjusting the length of a strut or leg for supporting roofing, for example for applications in the field of building yards and of works with overhead platforms, i.e. in scaffolds and/or in walking roofing.

BACKGROUND

It is known to associate a locking device with a telescopic tube for fixing the telescopic tube in an extracted position.

Reducing production costs is a sensitive issue, in particular when the telescopic tube is used for applications that imply a high risk of contamination, for example due to long stays under the action of atmospheric agents, with a focus on use simplicity and on maintenance simplicity, as may be in a use in the building field.

Moreover, it is important to protect the adjusting device and prevent, where possible, the presence of projecting radial struts which may be an element of accident or damage to the clothing of the yard personnel or a pedestrian passing by.

Document DE-A-19527738 describes a bar on which a toothed bushing is movable and lockable. The manual adjustment of the bushing position along the rod and the related locking, however, may be improved.

SUMMARY

The object of the present invention is to implement a telescopic tube provided with an adjusting device with a locking device free from the above-mentioned drawbacks.

The object of the present invention is achieved by a telescopic tube according to claim 1.

DESCRIPTION

A preferred embodiment will now be described for a better understanding of the present invention by way of a non-limiting example only, with reference to the accompanying drawings, in which:

FIGS. 2a, 2b are respective perspective and plan views of a male element for a telescopic tube according to the present invention;

Figure 1:
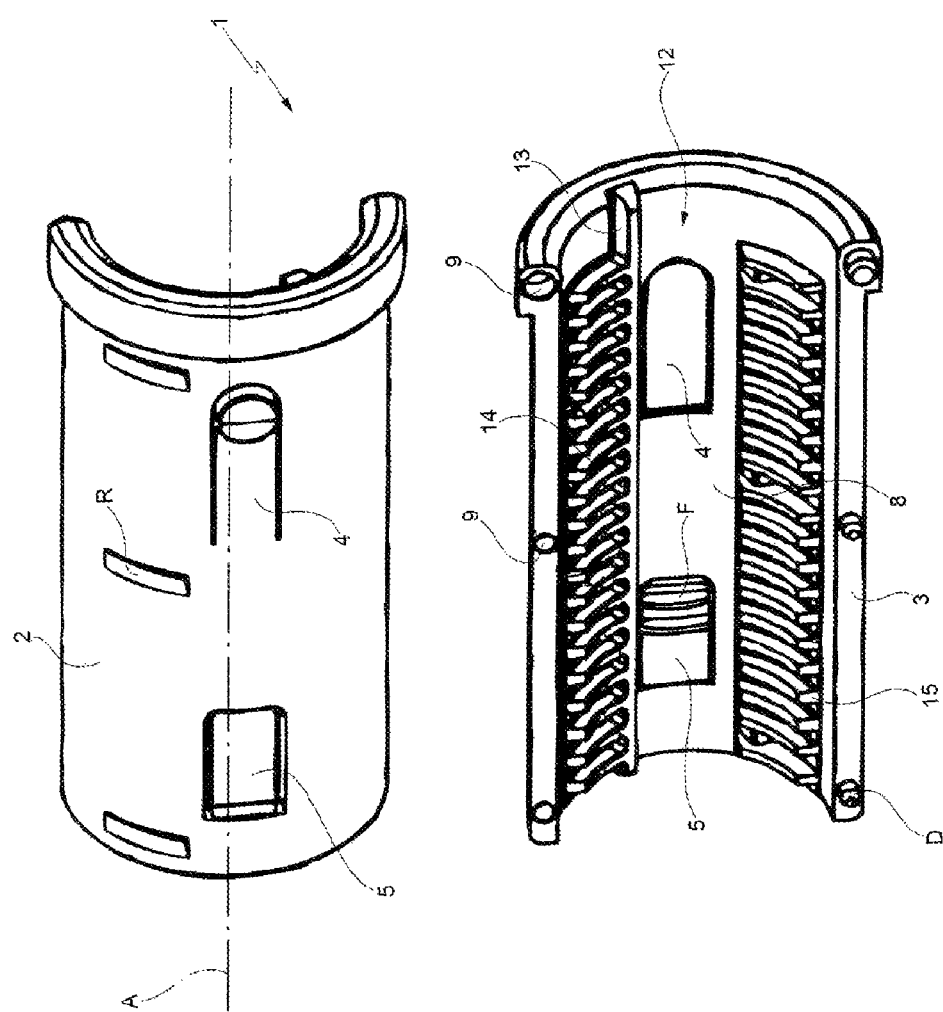
FIG. 1 is a perspective view of a female connecting group for a telescopic tube according to the present invention.

In FIG. 1, reference numeral 1 shows a bushing as a whole, having an axis A and comprising first and second half-shells 2, 3 obtained by molding a polymeric material, for example polyamide charged with glass fibers or particles between 20% and 40%. Bushing 1 comprises, preferably in each half-shell 2, 3, a snap-in element 4 for locking in axial direction in a tube 21 (shown in FIG. 4), a resilient axial abutment 5 cooperating with a male element 6 of the adjusting device, an inner toothing 7 and a guide 8, both arranged in longitudinal direction. Moreover, each bushing 1 comprises a resilient angular stop R selectively cooperating with the male element 6 for keeping a predetermined angular position (FIG. 3b) in which the male element 6 is axially rigidly constrained to bushing 1.

Moreover, each half-shell 2, 3 comprises a sequence of teeth D and slots 9 for defining a shape coupling and rigidly connecting the half-shells to each other.

Figure 3:
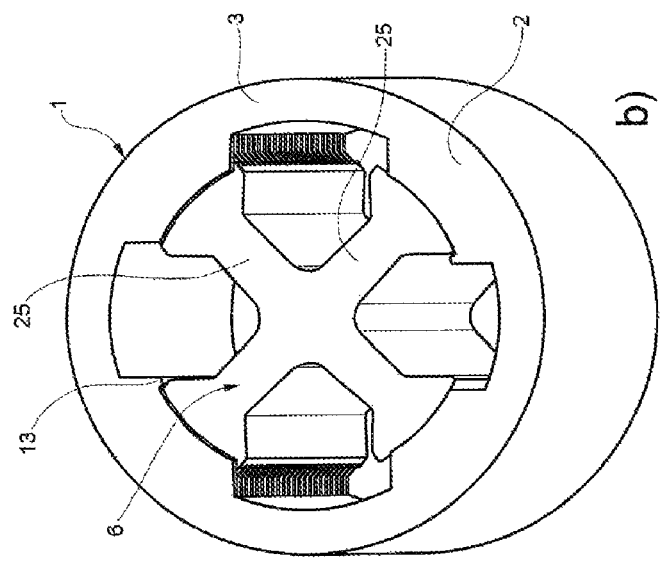
FIGS. 3a, 3b are respective perspective sectional views of an adjusting device for a telescopic tube according to the present invention in a locking position and in an adjusting position.
Figure 3:
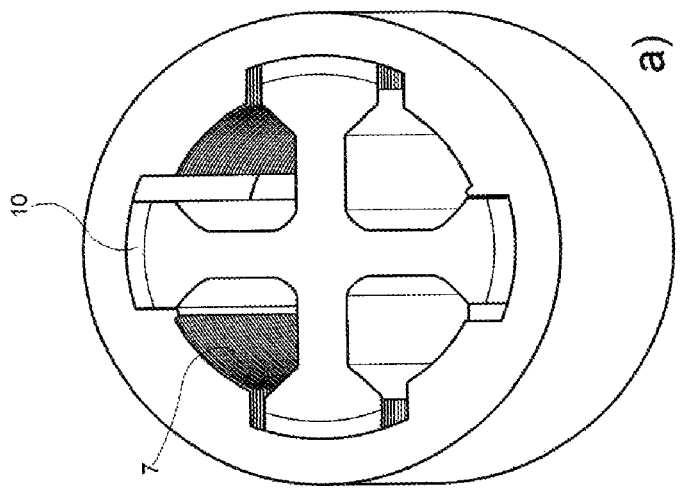
Figure 4:
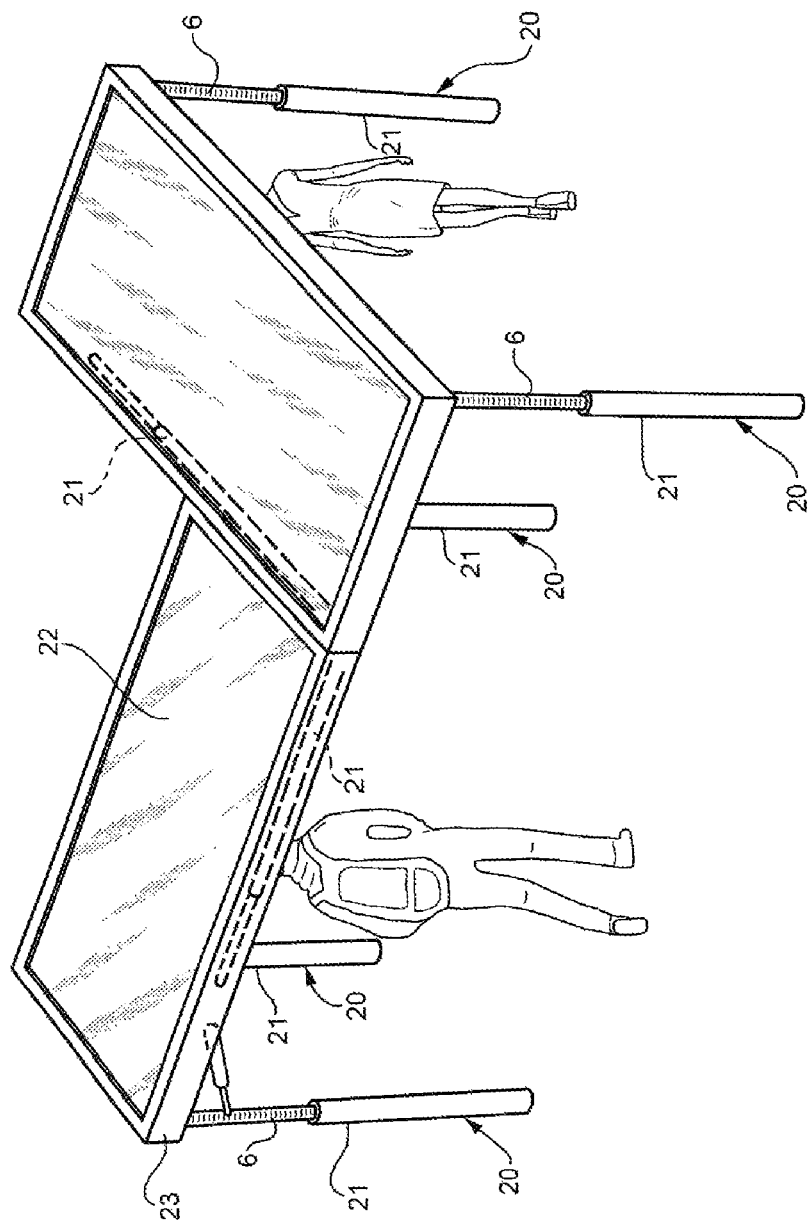
FIG. 4 shows a pedestrian protection panel provided with legs comprising a telescopic tube according to the present invention.

FIG. 2 shows in more detail the male element 6 comprising, preferably in a single body obtained by molding a polymeric material, for example the same material as bushing 1, an outer toothing 10 and a radial recess 11, coupling with guide 8 and toothing 7, respectively, for allowing the relative axial movement between bushing 1 and male element 6 in a predetermined angular sliding position (FIG. 3a).

Advantageously, toothing 10 engages the axial abutment 5 when bushing 1 and the male element 6 moves in axial direction with respect to each other and the axial abutment 5 is positioned so as to inform a user of the suitable relative axial position so that, following a relative angular displacement towards the angular position of FIG. 3b, the teeth of toothing 10 meshes with the slots of toothing 7 without substantial interferences. Advantageously, the sequence of teeth and slots of toothings 7, 10 is regular with constant pitch and is the equal for both toothings 7, 10.

The resilient angular stop R releasably engages the male element 6 for keeping the rigid axial constraint position and a user can manually disengage the male element 6 from bushing 1 by a rotation for a subsequent adjustment of the relative axial position between male element 6 and bushing 1 when the angular position of FIG. 3a is reached.

Advantageously, guide 8 defines a rectilinear recess 12 in axial direction selectively accommodating toothing 10, and a shoulder 13 also rectilinear and defining an angular stop for toothing 10 both in one direction of rotation and in the opposite direction. In particular, shoulder 13 defines a track so that toothing 10, kept in contact with the edge by the user, can axially slide without substantial interferences between toothings 7, 10. To this end, toothing 10 is accommodated with angular clearance in recess 12 when the male element 6 contacts shoulder 13 and bushing 1 can axially slide.

Moreover, shoulder 13 defines, when the male element 6 and bushing 1 are angularly rotated in an axial locking position (FIG. 3a), an angular travel end for defining the engagement position with the resilient angular stop R.

According to a preferred embodiment of the present invention, for each half-shell 2, 3 toothing 7 has a first and a second array of teeth 14, 15 arranged on opposite angular sides of guide 8.

Moreover, the resilient angular stop R comprises in the related half-shell 2, 3 one or more bending elements obtained by molding. The bending elements are preferably arranged along toothing 7 and engage a slot C defined by toothing 10, preferably on the tooth crest.

Likewise, the resilient axial abutment 5 is a bending element preferably obtained in a single body with the relevant half-shell 2, 3 and arranged along recess 12. The resilient axial abutment 5 may comprise a tooth F which interferes with those of toothing 10 and is accommodated into the slots of toothing 10. Tooth F is axially aligned and coplanar with a tooth of toothing 7. Advantageously (FIG. 4), three or more male elements 6 are connected to a panel 22 by means of a frame 23 which frames the panel and to which the male elements 6 are hinged. Moreover, the two half-shells 2, 3 are assembled and inserted in a tube 21 inside which they remain rigidly fixed through the snap-wise element 4 also preferably made in a single body. A telescopic tube 20 is defined in this way.

Preferably, the telescopic tubes 20 are movable to a closed position in which they are parallel to panel 22 so as to not protrude from frame 23 in a direction perpendicular to the panel. In this way, tube 21, bushing 1 and the male element 6 define a telescopic leg of variable length with improved locking for the panel.

When the panel is supported by the leg, bushing 1 and the male element 6 are loaded in compression by the weight of the panel. In this case, the leg length is fixed and kept by means of the coupling between toothings 7, 10. When the panel is lifted to be moved, it can be lifted by tube 21 and/or by the male element 6. In this latter case, toothings 7, 10 keep tube 21 axially rigidly connected to the male element 6.

When a user wishes to change the length of the telescopic tube 20, he/she rotates tube 21 up to abut against shoulder 13 along which the movement of tube 21 is guided. When tube 21 axially moves, toothing 10 interferes with the resilient axial abutment 5 which radially yields upon the passage of each tooth of toothing 10. When a user finds the desired axial length of leg 20, the resilient axial abutment 5 applies such a load on toothing 10 as to keep the axial position that allows the teeth of toothing 10 to encounter the slots of toothing 7 subsequent to a manual rotation of the user towards the angular locking position.

Moreover, the male element 6 defines a circular transversal section to which toothing 10 belongs and which is radially centered into bushing 1 for rotating with a minimum radial clearance and guiding the rotation movement. For example, the teeth and the slots of toothings 7, 10 define circumference arcs, are angularly equally spaced and are perpendicular to axis A. Advantageously, by engaging bushing 1, toothing 10 guides the relative rotation between the male element 6 and bushing 1 itself.

The advantages of the telescopic tube according to the present invention are as follows.

The telescopic tube 20 can be manufactured in a simple and cost-effective manner and the adjusting mechanism is not projecting with respect to tube 21.

Moreover, the use is easy, intuitive and quick both for defining the coupling position of toothings 7, 10 and reaching the locking position, by means of the resilient axial abutment 5, and for determining the desired length by means of the bayonet mechanism of toothings 7, 10 and shoulder 13. In particular, the axial sliding between bushing 1 and male element 6 allows a wide range of positions to be quickly reached, contrary to what would happen in a screw device, which forces a user to reach the desired positions by means of a mainly rotary movement tied to the screw pitch. The guided sliding by means of shoulder 13 allows a manual adjustment of the length of the telescopic tube so to prevent interferences between the toothings and increase the use simplicity, as is especially appreciated in some fields, among which the building field.

Finally, it is clear that changes or variations may be made to the telescopic tube described and illustrated herein without departing from the scope of protection as defined by the annexed claims.

For example, the male element 6 may comprise more than one rectilinear series of angularly spaced teeth and slots of toothing 10 in a single body. The series of slots and teeth are carried by respective longitudinal ribs 25 which laterally define the radial recesses 11.

Moreover, bushing 1 and the male element 6 can be mounted on an adjusting device for stretching cables and/or membranes of roofing and/or temporary frame structures.

The resilient axial abutment 5 and/or the resilient angular stop R and/or shoulder 13 may be provided, alternatively or in combination, on the male element 6. Moreover, the resilient axial abutment 5 and the resilient angular stop R may releasably also engage slots especially provided and spaced from toothings 10. The telescopic tube 20 can be attached between a vehicle seat and the related frame for defining a mechanism for adjusting the position with respect to the vehicle steering wheel. The suitably sized telescopic tube 20 can carry out the function of the retractile leg of a table.

Moreover, the telescopic tube may be coupled with actuating devices for automatically controlling the extraction of the male element 6 and/or the relative rotation between the angular locking position and the sliding position. In this way, the telescopic tube 20 can also be used for automatically moving hatches and overhead platforms.

Figure 5:
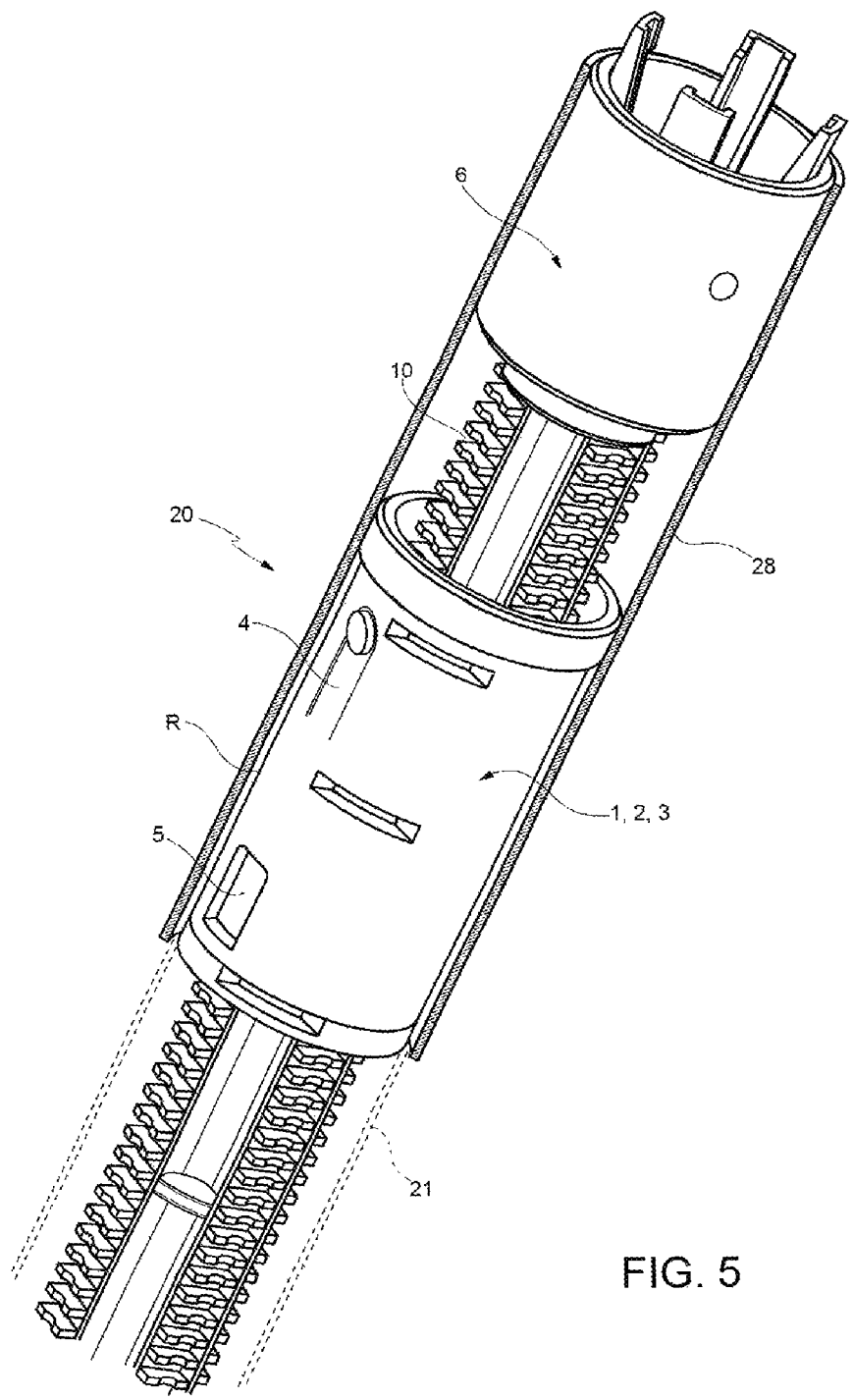
FIG. 5 shows an axonometric view of a detail of the telescopic tube according to the present invention with sectional or removed elements for clarity.

Moreover, also the male element 6 may be accommodated within an outer tube 28 (FIG. 5) inside which tube 21 is accommodated so that the latter is interposed in use between the male element and the outer tube. The outer tube 28 is attached to the male element 6 and tube 21 is axially movable with respect to the outer tube 28.

In particular, the resilient axial element 5 applies a radial load on the male element 6 such as to keep the selected position against the force of gravity and prevent accidental sliding before the bayonet locking movement.

Moreover, the male element 6 comprises a stop at an end thereof which engages bushing 1 to prevent accidental extractions. In this way, in order to separate the male element 6 from bushing 1 in axial direction it is necessary to extract the latter from tube 21 by opening the snap-wise element and then separate the half-shells 2 and 3.

Shoulder 13 may be continuous or have some interruptions. In this latter case, the longitudinal dimension of the interruptions has a smaller dimension than the distance between two consecutive teeth of toothing 7 so as to allow the track function and not cause substantial interferences during the axial movement or sliding of bushing 1 with respect to the male element 6.

It is to be understood that the foregoing description is intended to illustrate and not to limit the scope of the invention, which is defined by the scope of the appended claims. Other embodiments are within the scope of the following claims.

What is claimed is:

1. A telescopic tube having:
   an adjusting device comprising:
      a bushing including:
         an inner toothing angularly interrupted by a longitudinal recess, and an elongated shoulder connected to at least a portion of an edge of the inner toothing, wherein the elongated shoulder is parallel to an axis of the telescopic tube; and a male element insertable into an interior space of the bushing, the male element having an outer toothing angularly interrupted by a second recess, wherein the outer toothing of the male element is configured to axially slide along the longitudinal recess of the bushing when the male element is positioned in a first angular position relative to the bushing, and wherein the outer toothing of the male element is configured to engage the inner toothing of the bushing when the male element is rotated to a second angular position relative to the bushing, the second angular position different from the first angular position.

2. A telescopic tube according to claim 1, comprising an axial abutment formed in the bushing or the male element, the axial abutment configured to releasably engage a slot formed in the male element or the bushing, respectively, when the male element is disposed at an axial position relative to the bushing at which the outer toothing can engage the inner toothing.

3. A telescopic tube according to claim 2, in which the slot is defined by one of the inner and outer toothings.

4. A telescopic tube according to claim 1, comprising a stop formed in the bushing or the male element, the stop configured to releasably engage a slot formed in the male element or the bushing, respectively, when the male element is disposed at the second angular position relative to the bushing, and wherein the stop is configured to radially deform when a torque is applied between the bushing and the male element.

5. A telescopic tube according to claim 1, in which the shoulder defines an angular stop when the inner and outer toothings are engaged.

6. A telescopic tube according to claim 1, in which the bushing comprises first and second half-shells.

7. A telescopic tube according to claim 6, wherein the male element is formed of a single body of a polymeric material obtained by molding.

8. A telescopic tube according to claim 7, in which the inner and outer toothings each define circumference arcs.

9. A telescopic tube according to claim 1, in which the shoulder defines a continuous surface.

10. A telescopic tube according to claim 1, comprising:
a first tube for accommodating the bushing; and
a second tube telescopically accommodating the first tube and fixedly mounted with respect to the male element.

11. A telescopic tube according to claim 1, in which the elongated shoulder is disposed between the inner toothing and the longitudinal recess.

12. A telescopic tube according to claim 1, in which the elongated shoulder is configured to prevent contact between the outer toothing of the male element and the edge of the inner toothing when the male element is positioned in the first angular position.

13. A structure comprising:
a frame; and
a telescopic tube hinged to said frame, the telescopic tube comprising:
an adjusting device comprising:
a bushing including an inner toothing angularly interrupted by a longitudinal recess, and an elongated shoulder connected to at least a portion of an edge of the inner toothing, wherein the elongated shoulder is parallel to an axis of the telescopic tube; and
a male element insertable into an interior space of the bushing, the male element having an outer toothing angularly interrupted by a second recess,
wherein the outer toothing of the male element is configured to axially slide along the longitudinal recess of the bushing when the male element is positioned in a first angular position relative to the bushing, and
wherein the outer toothing of the male element is configured to engage the inner toothing of the bushing when the male element is rotated to a second angular position relative to the bushing, the second angular position different from first angular position.

* * * * *

UNITED STATES PATENT AND TRADEMARK OFFICE
CERTIFICATE OF CORRECTION

PATENT NO. : 9,638,228 B2  
APPLICATION NO. : 13/901968  
DATED : May 2, 2017  
INVENTOR(S) : Carmelo Montalto and Daniele Montalto Page 1 of 1

It is certified that error appears in the above-identified patent and that said Letters Patent is hereby corrected as shown below:

In the Specification

Column 1, Line 9, delete "702012000474," and insert -- TO2012000474, --

Signed and Sealed this  
Twenty-third Day of June, 2020

Andrei Iancu  
*Director of the United States Patent and Trademark Office*